US011550822B2

(12) United States Patent
Stanek

(10) Patent No.: US 11,550,822 B2
(45) Date of Patent: Jan. 10, 2023

(54) METHOD AND DEVICE FOR PROCESSING MEASUREMENT DATA

(71) Applicant: Rolls-Royce Deutschland Ltd & Co KG, Blankenfelde-Mahlow (DE)

(72) Inventor: Christian Stanek, Marquartstein (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 103 days.

(21) Appl. No.: 17/251,197

(22) PCT Filed: Jun. 18, 2019

(86) PCT No.: PCT/EP2019/065936
§ 371 (c)(1),
(2) Date: Dec. 10, 2020

(87) PCT Pub. No.: WO2020/002036
PCT Pub. Date: Jan. 2, 2020

(65) Prior Publication Data
US 2021/0165806 A1 Jun. 3, 2021

(30) Foreign Application Priority Data
Jun. 26, 2018 (DE) ...................... 10 2018 210 380.1

(51) Int. Cl.
*G06F 17/30* (2006.01)
*G06F 16/28* (2019.01)
(Continued)

(52) U.S. Cl.
CPC ........ *G06F 16/284* (2019.01); *G06F 16/2358* (2019.01); *G06F 16/2365* (2019.01); *G06F 16/24573* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 5,566,139 A * 10/1996 Abshire .................. G04F 10/06
368/118
9,841,371 B2 * 12/2017 Knopp ....................... G01J 3/42
(Continued)

FOREIGN PATENT DOCUMENTS

EP 1173739 B1 3/2003
EP 2557504 A1 2/2013

OTHER PUBLICATIONS

German Office Action for German Application No. 10 2018 210 380.1 dated Apr. 8, 2019.
(Continued)

*Primary Examiner* — Hung D Le
(74) *Attorney, Agent, or Firm* — Lempia Summerfield Katz LLC

(57) ABSTRACT

The invention relates to a processing, i.e. storing and analyzing, of measurement data. In order to store the measurement data, respective data units or data sets are created for sampling points, a plurality of measurement data temporally adjacent to the sampling-point measurement datum being stored within the data unit. A time interval between time values of the sampling-point measurement data of two consecutive data units at least is set approximately to a multiple of a sampling time interval, i.e. of a reciprocal of the measurement-value recording rate or sampling rate. The method according to the invention reduces the provision of data units because an individual data unit contains, in addition to a sampling-point measurement date, further measurement data temporally adjacent to the sampling-point measurement date. This measure reduces the management of data sets that is required in a database approximately by a factor which corresponds to the number of measurement data within the data unit designed according to the invention.

13 Claims, 2 Drawing Sheets

(51) Int. Cl.
*G06F 16/2457* (2019.01)
*G06F 16/23* (2019.01)

(56) References Cited

U.S. PATENT DOCUMENTS

2013/0338453 A1* 12/2013 Duke ................... A61B 5/7282
                                                      600/309
2015/0036135 A1*  2/2015 Knopp .................. G01J 3/0262
                                                      250/341.1

OTHER PUBLICATIONS

International Search Report and the Written Opinion for International Patent Application PCT/EP2019/065936 dated Oct. 14, 2019.

* cited by examiner

FIG 1

METHOD AND DEVICE FOR PROCESSING MEASUREMENT DATA

This application is the National Stage of International Application No. PCT/EP2019/065936, filed Jun. 18, 2019, which claims the benefit of German Patent Application No. 10 2018 210 380.1, filed Jun. 26, 2018. The entire contents of these documents are hereby incorporated herein by reference.

BACKGROUND

The present embodiments relate to processing measurement data.

Measurement or process data are usually acquired by a plurality of sensors or computer units in the environment of a technical system, which store the measurement data in a database after the measurement data have been acquired.

For the purpose of data analysis, the measurement data stored in the database are read by a measurement data evaluation application. Such an application is also referred to as a dashboard by professionals in the technical field.

In the prior art, use is often made of relational databases in which a measurement datum is stored at regular or irregular (e.g., demand-driven) sampling time intervals. A measurement datum usually consists of a measured value as the result of measured value sampling acquired with the sampling time interval and a time value, or else "time-stamp", representing a time of the measured value sampling. In this case, a respective data record is usually created in the database in order to store a measurement datum.

In a table-based implementation of a database, a data record corresponds to a row within a table. A key is used to unambiguously identify a data record. In the case of a large number of data records, management of the keys within the database causes an increased expenditure in terms of resources.

The acquisition of measurement or process data is highly memory-intensive, since a technical installation or a technical process usually gives rise to a multiplicity of data from different data sources that are to be acquired with an appropriately high sampling rate to analyze the measurement data. A correspondingly high data volume arises for acquiring, storing, and analyzing the measurement data. Storing each measurement datum in a respective data record of the database provides that the database takes up a correspondingly high data volume and, due to the high data volume, reacts correspondingly slowly in the event of a multiplicity of write and read operations, including the necessary management of the keys within the database.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method via which it is possible to store measurement data with a reduced data volume in order to be able to handle the measurement data more easily for analysis purposes during or following the completion of the measurement is provided. As another example, a device and a computer program product for performing the method are provided.

The method according to an embodiment provides a method for processing measurement data, in which, in order to store the measurement data, a plurality of measurement data are received. Each measurement datum includes at least one measured value as the result of measured value sampling acquired with a predefinable sampling time interval and a time value representing the time of the measured value sampling, and in which the measurement data are assigned to data units in a temporal order based on the time value of the measurement data. In this case, a respective data unit includes an interpolation point measurement datum as well as a plurality of measurement data temporally adjacent to the interpolation point measurement datum (e.g., that temporally follow or precede the interpolation point measurement datum), such that a time interval between the time values of the interpolation point measurement data of two successive data units corresponds at least approximately to a multiple of the sampling time interval.

One particular advantage of the present embodiments is that of reducing the data units, the storage of which in a database corresponds to a respective data record. While, in the prior art, one data unit is created for each measurement datum, the method according to the present embodiments reduces the provision of data units in that an individual data unit contains, in addition to an interpolation point measurement datum, further measurement data temporally adjacent to the interpolation point measurement datum. This measure reduces the management of data records required in a database by approximately a factor that corresponds to the number of measurement data within the data unit configured according to the present embodiments.

When analyzing the measured values, a plurality of eponymous interpolation points may be read or loaded for a first rough estimate of a temporal profile of the measured value, while the further measurement data are loaded subsequently only when a detailed analysis is required. Such detailing of the analysis of a temporal profile is also referred to as "deep drill" by professionals. The present embodiments support such a deep drill solely based on the advantageous memory structure, without further signal-theoretical algorithms being necessary for this purpose.

According to a refinement of the present embodiments, there is provision for the data unit to contain a predefinable number of temporally successive measurement data. A defined number of temporally successive measurement data within the data unit increases the efficiency in terms of storing and sampling measured values in comparison with the variant, likewise conceivable according to the present embodiments, of an event-oriented or demand-oriented number of temporally successive measurement data within the data unit.

According to a refinement of the present embodiments, there is provision for the measurement data contained in the data unit to be held in two separate tuples or vectors. The measurement and time values defining a measurement datum are stored separately in a respective tuple (e.g., in a first tuple of temporally successive measured values and in a second tuple of temporally successive time values). The association between the measured value and the time value of a respective measurement datum is established by the position in the respective tuple.

According to a refinement of the present embodiments, provision is made for a method for accessing measurement data, in which the following acts are performed: receiving a request to retrieve measurement data within a selected first time period; loading, from the data units, a temporally successive plurality of interpolation point measurement data situated within the selected first time period; aggregating the loaded interpolation point measurement data using a processor; and displaying the aggregated interpolation point measurement data.

The method according to this refinement implements rough analysis of a temporal profile of the measured value, in which initially only the interpolation point measurement data from the database are loaded from the data units.

According to one refinement of the present embodiments, provision is made for a method for accessing measurement data, in which, in order to access the measurement data in portions, the following additional acts are performed: receiving a request to retrieve detailed measurement data from a second time period situated within the first time period; loading, from the data units, the temporally successive plurality of measurement data situated within the selected second time period; aggregating the interpolation point measurement data loaded within the selected first time period with the measurement data loaded within the selected second time period using a processor; and displaying the interpolation point measurement data aggregated with the measurement data.

The method according to this refinement implements fine analysis of a temporal profile of the measured value, in which the measured data are additionally loaded from the data units in order to refine the framework, already represented, of interpolation point measurement data with the more finely temporally resolved measurement data. The selected second time period may be less than or equal to the first time period. In the first case, for example, it is possible to focus on a second time section of interest within the first time period.

According to one refinement of the present embodiments, provision is made for a device for processing measurement data, which is configured to perform a method according to the above-described refinements of the present embodiments. Such a device would be provided in the case of processing measurement data within the context of storing the measurement data (e.g., between a data acquisition unit or sensor and a database management system) in order to structure the raw data supplied by the data acquisition unit into data units according to the present embodiments and to transfer the raw data to the database management system for storage in the database.

In the case of processing measurement data within the context of analyzing the measurement data, such a device would be provided, for example, between a database management system and a data evaluation application in order to extract data units loaded from the database by the database management system into a temporally successive plurality of interpolation point measurement data or measurement data situated within a selected time period.

BRIEF DESCRIPTION OF THE DRAWINGS

FIG. 1 shows an exemplary illustration of two data structures for describing an ascertainment of an optimized data structure from a raw data structure according to an exemplary embodiment.

DETAILED DESCRIPTION

Figure 1:
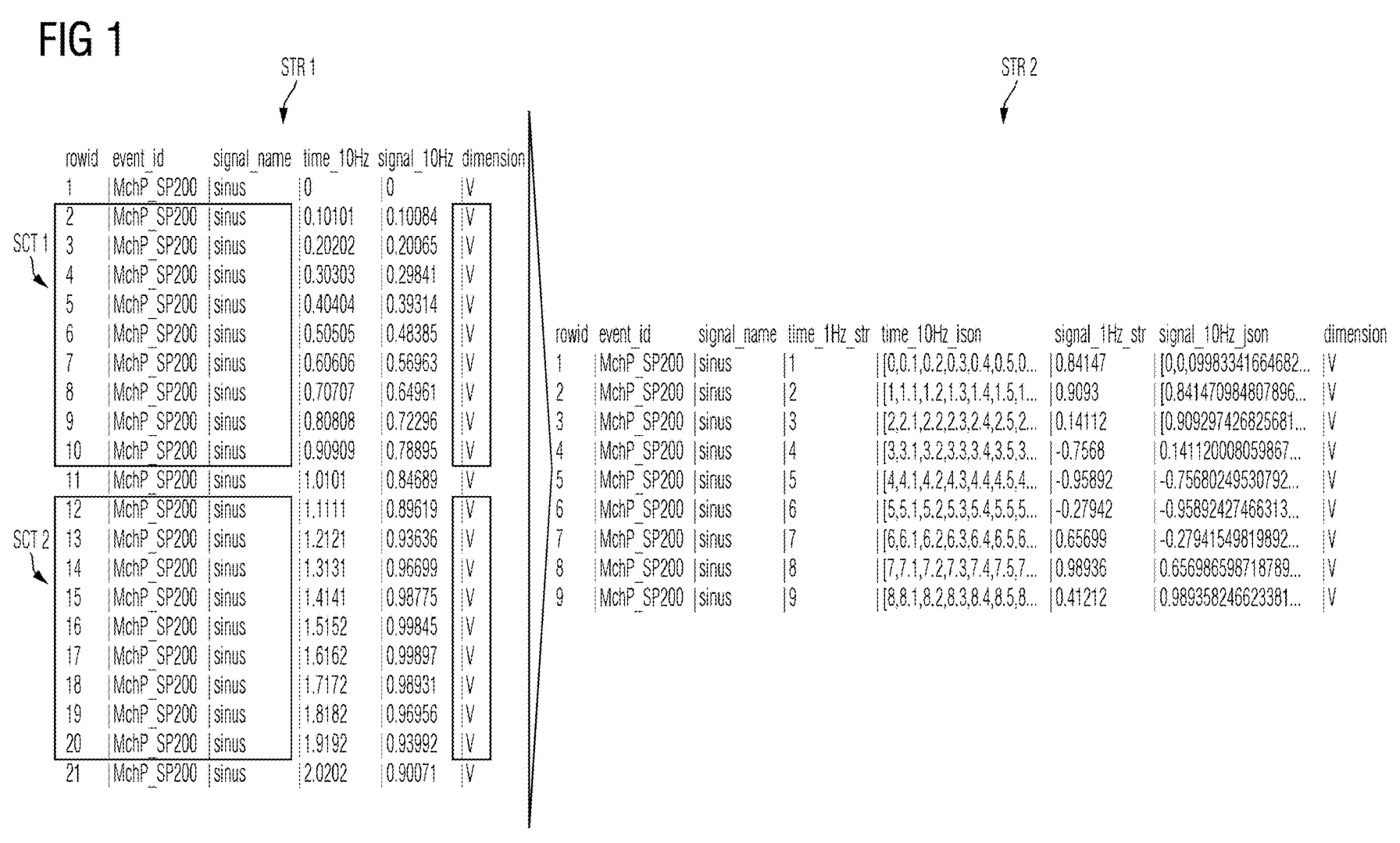
Figure 2:
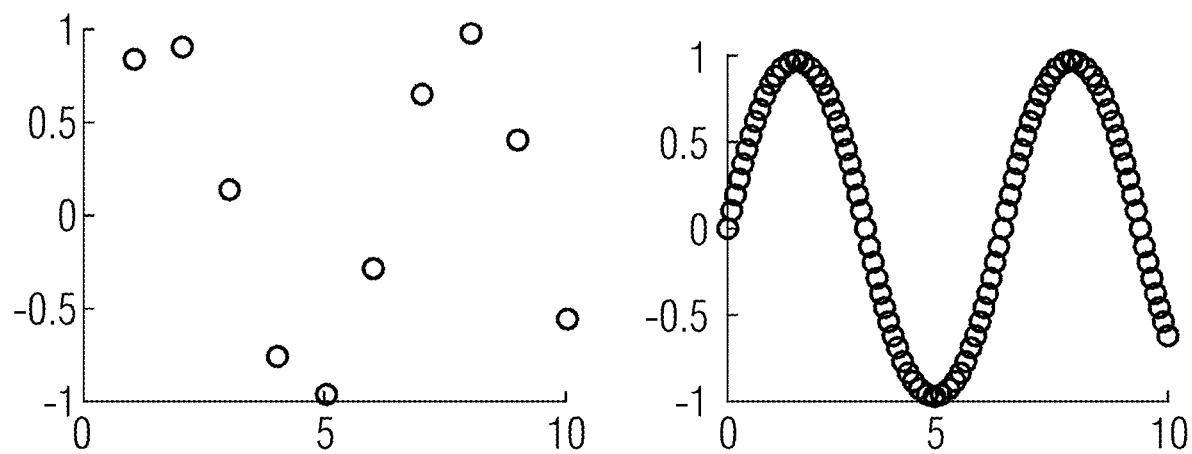
FIG. 2 shows an exemplary illustration of a temporal profile, reconstructed from a data structure, of measured values using interpolation point measurement data and using interpolation point measurement data aggregated with measurement data.

FIG. 1 shows an exemplary illustration of two data structures for describing ascertainment of a data structure from a raw data structure according to an exemplary embodiment.

The left-hand part of FIG. 1 shows a first data structure STR1, also referred to as raw data structure, which includes a plurality of data records arranged in rows. A data record corresponds to a row within the tabular illustration of the data structure STR1. To store a measurement datum, a respective data record (e.g., row) is created in the data structure STR1 in a manner currently practiced in the prior art. A key is used to unambiguously identify the data record. The key is also referred to as column identification number or row id in the drawing. The column identification numbers that are shown are formed by incremented natural numbers 1,2,3,4, etc.

A further optional column of the data structure STR1 includes an event or source identification "event_id" that, in the example shown, is assigned the designation "MchP_SP200" for all data records. A further optional column of the data structure STR1 includes a signal designation "signal_name" that, in the example shown, is assigned the designation "sinus" for all data records.

The measurement datum is finally stored in two further columns "time_10 Hz" and "Signal_10 Hz". The measurement datum includes a measured value "Signal_10 Hz" as the result of measured value sampling acquired with the sampling time interval (e.g., 0.1 seconds corresponding to a measured value sampling rate of 10 Hertz) and a time value "time_10 Hz" representing a time of the measured value sampling.

A further optional column of the data structure STR1 includes a dimension "V" of the measured value, which, in the example shown, is assigned the designation "V" for all data records. An electrical voltage with the dimension volts is accordingly measured as measured value.

To illustrate the exemplary embodiments, an explanation is given of data value sampling or "sampling" of a sinusoidal signal with a sampling time interval of 0.1 seconds, corresponding to a sampling rate of 10 Hz (Hertz). In the drawing, the column "time_10 Hz" shows the time values representing the time of the measured value sampling, according to which the sampling time interval is not exactly 0.1 seconds, but rather 0.10101 seconds (cf. the first time value "time_10 Hz" following a time value of zero in the second row with a row id of 2). This discrepancy is not relevant to the description of the exemplary embodiment.

The first data structure STR1 that is shown may, in this respect, represent a conventionally stored data record within a database in which a measurement datum was stored at a regular sampling time interval of 0.1 seconds and in which a respective data record or row was created in order to store a measurement datum.

According to a method according to the present embodiments, this first data structure STR1, however, serves only as raw data structure, which is not necessarily stored in a database but, for example, in a volatile memory (e.g., a cache) in order to be transformed in a further act into a data structure STR2 optimized according to the present embodiments.

In order to transform the first data structure STR1 into the optimized data structure STR2, there is provision to integrate a plurality of measurement data in a respective data unit (e.g., a data record or a row) of the optimized data structure STR2 (e.g., an interpolation point measurement datum and a plurality of measurement data temporally adjacent to the interpolation point measurement datum).

For illustrative purposes, two sections SCT1, SCT2 each with nine data records are marked in the drawing in the first data structure STR1. The first nine measurement data with a rowid of 2, 3, . . . , 10 within the first section SCT1 are stored together with an interpolation point measurement datum of a data record following the first section SCT1 with the rowid 11 in a first optimized data record. The second nine measurement data with a rowid of 12, 13, . . . , 20 within the second section SCT2 are stored together with an interpolation point measurement datum of a data record following the second section SCT2 with the rowid 21 in a second optimized data record. The same procedure is adopted with further data records that are not illustrated in the drawing.

The right-hand part of FIG. 1 shows the second optimized data structure STR2, which contains the previously described first optimized data record as first row with a rowid of 1 and the previously described second optimized data record as second row with a rowid of 2. The subsequently illustrated optimized data records with a rowid of 3, 4 . . . 9 of the second optimized data structure STR2 are formed in a corresponding manner from the respective data records (not illustrated) of the first data structure STR1.

Each of the optimized data records or data units to be formed according to the present embodiments contains an interpolation point measurement datum as well as a plurality of measurement data temporally adjacent to the interpolation point measurement datum (e.g., according to the embodiment shown with nine temporally preceding measurement data).

The interpolation point measurement datum does not differ structurally from a measurement datum in this case but is, as will be shown below, stored at a "more prominent" position within a data record in order to provide faster access to the interpolation point measurement datum in comparison with a measurement datum.

Each of the optimized data records or data units to be formed according to the present embodiments is configured such that a time interval (e.g., one second, corresponding to 1 Hz) between the time values of the interpolation point measurement data of two successive data units corresponds at least approximately to a multiple (e.g., a factor of 10) of the sampling time interval (e.g., 0.1 seconds, corresponding to a sampling rate of 10 Hz). In the embodiment illustrated, the time interval between the time values of the interpolation point measurement data is selected to be one second, which corresponds to a factor of 10 with respect to the sampling time interval of 0.1 seconds. In other words, this provides that merely considering the interpolation point measurement data would correspond to a sampling rate of 1 Hertz in comparison with a sampling rate of 10 Hertz when considering all measurement points.

In the drawing, the entries "time_10 Hz" in the interpolation point measurement data with the rowid 11 and the rowid 21 of the first data structure STR1 do not show exactly the per se expected values of 1.0000 and 2.0000 seconds, but rather a value of 1.0101 or 2.0202 seconds. As already explained above, this discrepancy is due only to rounding and computational inaccuracies for simulating the exemplary embodiment using a sinusoidal signal.

As shown in FIG. 1, the optimized data unit (e.g., the optimized data record or row) with the rowid 1 in the second optimized data structure STR2 contains an interpolation point measurement datum that includes a measured value "signal_1 Hz_str" with a value of 0.81747 V and a time value "time_1 Hz_str", representing the time of this measured value, with a value of 1 second (s). In this case too, the interpolation point measurement datum with the rowid 11 thus deviates from the first data structure STR1, for which a measured value "signal_10 Hz" with a value of 0.84689 V and a time value "time_10 Hz", representing the time of this measured value, with a value of 1.0101 s would be expected.

The discrepancy is due to rounding inaccuracies and slight time differences in the acquisition of the values. As already explained above, this discrepancy is due only to rounding and computational inaccuracies for simulating the exemplary embodiment using a sinusoidal signal and has no influence on the feasibility or significance of the present embodiments.

The optimized data unit (e.g., the optimized data record or row) with the rowid 2 in the second optimized data structure STR2 contains an interpolation point measurement datum that includes a measured value "signal_1 Hz_str" with a value of 0.9093 V and a time value "time_1 Hz_str", representing the time of this measured value, with a value of 2 s. In this case too, the interpolation point measurement datum with the rowid 21 thus deviates from the first data structure STR1, for which a measured value "signal_10 Hz" with a value of 0.90071 V and a time value "time_10 Hz", representing the time of this measured value, with a value of 2.0202 s would be expected. The comments above apply to the significance of this discrepancy.

The nine measurement data with a rowid of 2, 3, . . . , 10 within the first section SCT1 of the first data structure STR1 are each separated into temporally successive measured values and into temporally successive time values, and then into a first tuple of temporally successive measured values and a second tuple of temporally successive time values. The association between the measured value and the time value of a respective measurement datum is in this case provided by the position in the respective tuple.

The first tuple of temporally successive measured values is stored in the field "signal_10 Hz_json" of the optimized data record with the rowid 1, and the second tuple of temporally successive time values is stored in the field "time_10 Hz_json" of the optimized data record with the rowid 1. As shown in FIG. 1, the first tuple of temporally successive measured values in the field "signal_1 Hz_json" contains an excerpt of values (0, 0.09983341664682 . . . ) limited by the drawing. The second tuple of temporally successive time values in the field "time_10 Hz_json" field contains the rounded values (0, 0.1, 0.2, 0.4, 0.5, . . . ). A decimal separating point is represented in this case by a dot (.), and a separation of the ordered entries or positions of the tuple is represented by a respective comma (,).

In a corresponding manner, the nine measurement data with a rowid of 12, 13, . . . , 20 within the second section SCT2 of the first data structure STR1 are each separated into temporally successive measured values, into temporally successive time values, and into a first tuple of temporally successive measured values and a second tuple of temporally successive time values. The first tuple of temporally successive measured values is stored in the field "signal_10 Hz_json" of the optimized data record with the rowid 2, and the second tuple of temporally successive time values is stored in the field "time_10 Hz_json" of the optimized data record with the rowid 2. As shown in FIG. 1, the first tuple of temporally successive measured values in the field "signal_1 Hz_json" contains an excerpt of values (0.841470984807896 . . . ) limited by the drawing. The second tuple of temporally successive time values in the field "time_10 Hz_json" field contains the rounded values (1.1, 1.2, 1.3, 1.2, 1.5, . . . ).

The same procedure is adopted with further measurement data and optimized data records. The association between the measured value and the time value of a respective measurement datum is provided by the position in the respective tuple.

An exemplary code for converting the first data structure STR1 into the second data structure STR2 is shown below:

```
% Import Data into MATLAB
conn = sqlite ('flight.db', 'readonly');
measurement_Table_data = fetch (conn, 'SELECT * FROM
measurement_table');
close (conn);
time = [ ];
signal = [ ];
for i=1:size (measurement_Table_data,1)
    time_10Hz_json (1,i) = jsondecode (measurement_Table_data
    {i,4});
    time = [time,transpose(time_10Hz_json{1,i})];
    signal_10Hz_json{1,i} = jsondecode (measurement_Table_data
    {i,6});
    signal = [signal,transpose(signal_10Hz_json{1,i})];
end
```

One particular advantage of the present embodiments is that of reducing the second data structure STR2 in comparison with the first data structure STR1. When the first data structure STR1 is stored in a file in a database-editable format *.db, this file has a memory size of 9 kB, while the storage of the second data structure STR2 has a memory size of only 2 kB.

The measure according to the present embodiments of storing the measurement data reduces the management of data records required in a database by approximately a factor that corresponds to the number of measurement data within the data unit configured according to the present embodiments. The factor selected in this exemplary embodiment may accordingly also be increased to values of 20 or 100 in order to achieve a further reduction in memory size.

According to one refinement of the present embodiments, the measurement data stored according to the present embodiments are accessed by loading, from the data units, the temporally successive plurality of interpolation point measurement data situated within a first time period able to be selected by an operator. These interpolation point measurement data may possibly already be sufficient for a rough analysis of the temporal profile. The left-hand part of FIG. 2 shows a depiction of a temporal profile, reconstructed from a data structure, of measured values using only interpolation point measurement data (e.g., without using the measurement data associated in the respective same data record). The interpolation point measurement data are aggregated by a processor by virtue of measured values sampled from the interpolation points being plotted against the time values sampled from the interpolation points. The value profile plotted in the left-hand part of FIG. 2 already resembles a sinusoidal shape.

For a fine analysis or "deep drill" of the temporal profile, the measurement data stored in tuples are loaded in addition to the interpolation point measurement data. The right-hand part of FIG. 2 shows a depiction of a temporal profile, reconstructed from a data structure, of measured values using interpolation point measurement data and measurement data. The loaded interpolation point measurement data are aggregated with the loaded measurement data by a processor. The value profile plotted in the right-hand part of FIG. 2 clearly shows a sinusoidal shape.

In summary, the present embodiments relate to the processing of measurement data (e.g., the storage and analysis thereof), in which, in order to store the measurement data, a respective data unit or data record is created for interpolation points. A plurality of measurement data temporally adjacent to the interpolation point measurement datum are stored within this data unit. A time interval between time values of the interpolation point measurement data of two successive data units is in this case set at least approximately to a multiple of a sampling time interval (e.g., a reciprocal value of the measured value acquisition rate or sampling rate). The method according to the present embodiments reduces the provision of data units in that an individual data unit, in addition to an interpolation point measurement datum, contains further measurement data temporally adjacent to the interpolation point measurement datum. This measure reduces the management of data records required in a database by approximately a factor that corresponds to the number of measurement data within the data unit designed according to the present embodiments.

In summary, the present embodiments offer the following advantages: The present embodiments provide a combination of an interpolation point approach from signal theory with "deep drill" handling of analysis tools or dashboards, implemented using a time and signal series defined in sections for a higher resolution. The concept of interpolation points for reducing data units or data records reduces a management overhead in terms of database operations. The loading and storage of retained signal series and time series (e.g., tuples of temporally successive measured values and tuples of temporally successive time values) are subject to the same software processing (e.g., to a same algorithm). Choosing a larger ratio between the time interval between the time values of the interpolation point measurement data of two successive data units and the sampling time interval (e.g., the ratio between the sampling rate and the interpolation points) increases savings in terms of storage space or overhead for the database if necessary. No complex signal processing algorithms are required to achieve the efficiency advantages when storing the measurement data. The structure and contents of the tuples of temporally successive measured values and tuples of temporally successive time values remain fixed during storage and also during analysis. No complex database operations, such as, for example, insert operations, are thus necessary.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for processing measurement data, the method comprising:
   storing the measurement data, the storing of the measurement data comprising:
      receiving a plurality of measurement data, wherein each measurement datum of the plurality of measurement data comprises at least one measured value as the result of measured value sampling acquired with a predefinable sampling time interval and a time value representing a time of the measured value sampling; and assigning the measurement data to data units in a time order based on the time value of the measurement data;

wherein a respective data unit of the data units comprises an interpolation point measurement datum and a plurality of measurement data temporally adjacent to the interpolation point measurement datum, such that a time interval between the time values of the interpolation point measurement data of two successive data units of the data units corresponds at least approximately to a multiple of the predefinable sampling time interval.

2. The method of claim 1, wherein the data units are data records in a database.

3. The method of claim 1, wherein the respective data unit contains a predefinable number of temporally successive measurement data.

4. The method of claim 3, wherein the measurement data contained in the respective data unit are stored as a first tuple of temporally successive measured values and a second tuple of temporally successive time values, and wherein an association between the measured value and the time value of a respective measurement datum is established by a position in the respective tuple.

5. The method of claim 1, further comprising accessing the measurement data, the accessing of the measurement data comprising:

receiving a request to retrieve measurement data within a selected first time period;

loading, from the data units, a temporally successive plurality of interpolation point measurement data situated within the selected first time period;

aggregating the loaded interpolation point measurement data using a processor; and displaying the aggregated interpolation point measurement data.

6. The method of claim 5, further comprising accessing the measurement data in portions, the accessing of the measurement data in portions comprising:

receiving a request to retrieve detailed measurement data from a second time period situated within the first time period;

loading, from the data units, the temporally successive plurality of measurement data situated within the selected second time period;

aggregating the interpolation point measurement data loaded within the selected first time period with the measurement data loaded within the selected second time period using the processor; and displaying the interpolation point measurement data aggregated with the measurement data.

7. A device for processing measurement data, the device comprising:

a processor configured to:

store the measurement data, the store of the measurement data comprising:

receipt of a plurality of measurement data, wherein each measurement datum of the plurality of measurement data comprises at least one measured value as the result of measured value sampling acquired with a predefinable sampling time interval and a time value representing a time of the measured value sampling; and assignment of the measurement data to data units in a time order based on the time value of the measurement data;

wherein a respective data unit of the data units comprises an interpolation point measurement datum and a plurality of measurement data temporally adjacent to the interpolation point measurement datum, such that a time interval between the time values of the interpolation point measurement data of two successive data units of the data units corresponds at least approximately to a multiple of the predefinable sampling time interval.

8. In a non-transitory computer-readable storage medium that stores instructions executable by one or more processors to process measurement data, the instructions comprising:

storing the measurement data, the storing of the measurement data comprising:

receiving a plurality of measurement data, wherein each measurement datum of the plurality of measurement data comprises at least one measured value as the result of measured value sampling acquired with a predefinable sampling time interval and a time value representing a time of the measured value sampling; and assigning the measurement data to data units in a time order based on the time value of the measurement data;

wherein a respective data unit of the data units comprises an interpolation point measurement datum and a plurality of measurement data temporally adjacent to the interpolation point measurement datum, such that a time interval between the time values of the interpolation point measurement data of two successive data units of the data units corresponds at least approximately to a multiple of the predefinable sampling time interval.

9. The non-transitory computer-readable storage medium of claim 8, wherein the data units are data records in a database.

10. The non-transitory computer-readable storage medium of claim 8, wherein the respective data unit contains a predefinable number of temporally successive measurement data.

11. The non-transitory computer-readable storage medium of claim 10, wherein the measurement data contained in the respective data unit are stored as a first tuple of temporally successive measured values and a second tuple of temporally successive time values, and wherein an association between the measured value and the time value of a respective measurement datum is established by a position in the respective tuple.

12. The non-transitory computer-readable storage medium of claim 8, wherein the instructions further comprise accessing the measurement data, the accessing of the measurement data comprising:

receiving a request to retrieve measurement data within a selected first time period;

loading, from the data units, a temporally successive plurality of interpolation point measurement data situated within the selected first time period;

aggregating the loaded interpolation point measurement data using a processor; and displaying the aggregated interpolation point measurement data.

13. The non-transitory computer-readable storage medium of claim 12, wherein the instructions further comprise accessing the measurement data in portions, the accessing of the measurement data in portions comprising:
- receiving a request to retrieve detailed measurement data from a second time period situated within the first time period;
- loading, from the data units, the temporally successive plurality of measurement data situated within the selected second time period;
- aggregating the interpolation point measurement data loaded within the selected first time period with the measurement data loaded within the selected second time period using the processor; and
- displaying the interpolation point measurement data aggregated with the measurement data.

* * * * *